US010362126B2

(12) United States Patent
Grewal et al.

(10) Patent No.: US 10,362,126 B2
(45) Date of Patent: *Jul. 23, 2019

(54) ENABLING PHOTOSET RECOMMENDATIONS

(71) Applicant: FACEBOOK, INC., Menlo Park, CA (US)

(72) Inventors: Emily Grewal, Palo Alto, CA (US); Joe Binney, Palo Alto, CA (US); Xiao Ou Wang, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 15/016,103

(22) Filed: Feb. 4, 2016

(65) Prior Publication Data

US 2016/0164988 A1    Jun. 9, 2016

Related U.S. Application Data

(63) Continuation of application No. 13/843,100, filed on Mar. 15, 2013, now Pat. No. 9,282,138.

(51) Int. Cl.
*H04L 29/08* (2006.01)

(52) U.S. Cl.
CPC .............. *H04L 67/22* (2013.01); *H04L 67/02* (2013.01); *H04L 67/18* (2013.01); *H04L 67/306* (2013.01)

(58) Field of Classification Search
None
See application file for complete search history.

(56) References Cited

U.S. PATENT DOCUMENTS

| 5,731,805 | A | 3/1998 | Tognazzini et al. |
| 6,606,102 | B1 | 8/2003 | Odom |
| 7,827,208 | B2 | 11/2010 | Bosworth et al. |
| 7,853,622 | B1 * | 12/2010 | Baluja ............... G06Q 30/02 707/803 |
| 8,190,692 | B1 | 5/2012 | Zilka |
| 8,225,376 | B2 | 7/2012 | Zuckerberg et al. |

(Continued)

OTHER PUBLICATIONS

U.S. Appl. No. 13/843,100, dated Apr. 27, 2015, Office Action.
U.S. Appl. No. 13/843,100, dated Oct. 28, 2015, Notice of Allowance.

*Primary Examiner* — Backhean Tiv
(74) *Attorney, Agent, or Firm* — Keller Jolley Preece (57) ABSTRACT

In a social networking system, photographs and photographic sets are recommended to a user based upon information gathered from the user's social networking profile, as well as information gathered from the social networking profile of the user's friends, and the general pattern of usage by the user of various elements of the social network. In one embodiment, information entered into the social networking profile of the user is used to recommend additional photos and sets of photos. In one embodiment, user preferences indicated by the user via elements of the social network are considered in recommending photos or photo sets. In one embodiment, the general usage pattern of the social network is considered when recommending additional photos and sets of photos to the user. In one embodiment, profile information, usage information, or the indicated preferences of the user's friends are used to recommend additional photos and photo sets.

20 Claims, 9 Drawing Sheets

(56) References Cited

U.S. PATENT DOCUMENTS

| | | | |
|---|---|---|---|
| 8,254,684 B2* | 8/2012 | Raju | G06Q 30/02 382/181 |
| 8,306,975 B1 | 11/2012 | Eldering | |
| 8,311,950 B1* | 11/2012 | Kunal | G06Q 30/0201 705/319 |
| 9,021,352 B2* | 4/2015 | Goel | G06F 17/21 715/200 |
| 9,282,138 B2* | 3/2016 | Grewal | H04L 67/306 |
| 9,754,043 B2* | 9/2017 | Parker | G06F 16/957 |
| 10,043,025 B2* | 8/2018 | Ibel | G06F 21/6218 |
| 2002/0075330 A1* | 6/2002 | Rosenzweig | G06F 16/58 715/854 |
| 2003/0016383 A1* | 1/2003 | Culp | H04N 1/00236 358/1.15 |
| 2003/0220995 A1* | 11/2003 | Hitaka | H04N 1/00127 709/223 |
| 2004/0162126 A1* | 8/2004 | Rehm | A63F 3/0423 463/9 |
| 2006/0253581 A1 | 11/2006 | Dixon et al. | |
| 2007/0127833 A1* | 6/2007 | Singh | G06F 16/583 382/254 |
| 2007/0162876 A1* | 7/2007 | Quirk | G06F 16/954 715/853 |
| 2008/0040474 A1* | 2/2008 | Zuckerberg | G06Q 30/02 709/224 |
| 2008/0091723 A1 | 4/2008 | Zuckerberg et al. | |
| 2008/0162568 A1* | 7/2008 | Shen | G06Q 30/02 |
| 2008/0195657 A1* | 8/2008 | Naaman | G06K 9/00677 |
| 2009/0150786 A1 | 6/2009 | Brown | |
| 2009/0299824 A1 | 12/2009 | Barnes, Jr. | |
| 2009/0307168 A1* | 12/2009 | Bockius | G06F 16/9535 706/46 |
| 2010/0036934 A1* | 2/2010 | Bruster | H04L 51/04 709/219 |
| 2010/0088182 A1* | 4/2010 | Ryder | G06Q 10/107 705/14.66 |
| 2010/0198683 A1* | 8/2010 | Aarabi | G06Q 30/02 705/14.49 |
| 2010/0281084 A1* | 11/2010 | Gupta | G06F 16/54 707/822 |
| 2011/0012929 A1* | 1/2011 | Grosz | G06K 9/6267 345/661 |
| 2011/0043643 A1* | 2/2011 | Yu | H04N 1/00209 348/207.1 |
| 2011/0055718 A1* | 3/2011 | Tanaka | G06F 3/0482 715/747 |
| 2011/0142299 A1* | 6/2011 | Akbarzadeh | G06K 9/00288 382/118 |
| 2011/0145719 A1* | 6/2011 | Chen | G06Q 10/10 715/739 |
| 2011/0148857 A1* | 6/2011 | Krupka | G06F 16/5854 345/419 |
| 2011/0161409 A1 | 6/2011 | Nair et al. | |
| 2011/0188742 A1* | 8/2011 | Yu | G06K 9/6218 382/159 |
| 2011/0191321 A1* | 8/2011 | Gade | G06F 12/08 707/709 |
| 2011/0280476 A1* | 11/2011 | Berger | G06T 11/60 382/163 |
| 2011/0280497 A1* | 11/2011 | Berger | G06T 11/60 382/306 |
| 2011/0320380 A1* | 12/2011 | Zahn | G06Q 30/0282 705/347 |
| 2012/0011430 A1* | 1/2012 | Parker | G06F 16/957 715/234 |
| 2012/0041907 A1* | 2/2012 | Wang | G06Q 30/02 706/12 |
| 2012/0078954 A1* | 3/2012 | Araya | H04N 5/44543 707/769 |
| 2012/0159337 A1* | 6/2012 | Travilla | G06Q 30/0631 715/738 |
| 2012/0239506 A1* | 9/2012 | Saunders | G06Q 30/02 705/14.67 |
| 2012/0303626 A1 | 11/2012 | Friedmann et al. | |
| 2013/0013622 A1* | 1/2013 | Elliot-McCrea | G06F 16/48 707/751 |
| 2013/0021368 A1* | 1/2013 | Lee | H04N 1/00153 345/619 |
| 2013/0073280 A1* | 3/2013 | O'Neil | G06F 17/2881 704/9 |
| 2013/0103742 A1* | 4/2013 | Hsi | G06Q 30/0282 709/203 |
| 2013/0148864 A1* | 6/2013 | Dolson | G06F 16/58 382/115 |
| 2013/0151539 A1* | 6/2013 | Shi | G06F 16/9535 707/754 |
| 2013/0156274 A1* | 6/2013 | Buchmueller | G06Q 10/101 382/118 |
| 2013/0185220 A1* | 7/2013 | Good | G06Q 50/01 705/329 |
| 2013/0251201 A1* | 9/2013 | Zhou | G06K 9/00228 382/103 |
| 2013/0262970 A1* | 10/2013 | Srikrishna | G06F 16/51 715/205 |
| 2013/0339358 A1* | 12/2013 | Huibers | H04L 51/32 707/737 |
| 2014/0040774 A1* | 2/2014 | Charytoniuk | G06F 16/58 715/753 |
| 2014/0052663 A1 | 2/2014 | Kelley et al. | |
| 2014/0074879 A1* | 3/2014 | Kwon | G06F 16/48 707/769 |
| 2014/0089816 A1* | 3/2014 | DiPersia | G06F 3/0484 715/753 |
| 2014/0137030 A1 | 5/2014 | Matas | |
| 2014/0181205 A1* | 6/2014 | Sherrets | G06Q 50/01 709/204 |
| 2014/0195921 A1* | 7/2014 | Grosz | G06F 3/1242 715/738 |
| 2014/0258297 A1* | 9/2014 | Davari | G06F 16/58 707/737 |
| 2014/0280565 A1* | 9/2014 | Grewal | H04L 67/306 709/204 |
| 2016/0164988 A1* | 6/2016 | Grewal | H04L 67/306 709/204 |
| 2017/0331865 A1* | 11/2017 | Yeskel | G06Q 50/01 |

\* cited by examiner

ENABLING PHOTOSET RECOMMENDATIONS

CROSS-REFERENCE TO RELATED APPLICATIONS

This application is a continuation of U.S. application Ser. No. 13/843,100, filed Mar. 15, 2013, which is hereby incorporated by reference.

FIELD OF THE INVENTION

This invention relates generally to social networking systems, and in particular to providing photoset recommendations for users of a social networking system.

DESCRIPTION OF THE RELATED ART

A social networking system allows users to designate other users or entities as connections, or otherwise connect to, or form relationships with, other users or entities. Additionally, users can contribute and interact with their connections, use applications, join groups, list and confirm attendance at events, invite connections, and perform other tasks that facilitate social interaction. External applications also use the services of a social networking system to allow authenticated users to incorporate some of the above social interactions with use of the external applications.

In recent years, social networking systems have made it easier for users to share their interests and preferences in real-world concepts, such as their favorite movies, musicians, celebrities, soft drinks, hobbies, sports teams, and activities. Additionally, users can share photographs they have taken with friends on their social network using various methods. In addition to sharing photographs, users can group photographs into albums based on the user's personal preference, and can categorized photographs with various tags to link the photo with certain people, places, or events. The user's friends can then browse the photographic album, and can also browse photographs similar to, or associated with the photographs in the user's albums.

BRIEF DESCRIPTION OF THE DRAWINGS

A better understanding of the present invention can be obtained from the following detailed description in conjunction with the following drawings, in which.

DETAILED DESCRIPTION

Systems and methods for generating and recommending dynamic, relationship-based sets of photographs are described. In one embodiment, photographic sets are generated based upon information submitted via a user's social networking profile, as well as information from the social networking profile of the user's friends, and the general pattern of usage by the user. The degree to which any user's information is shared with other users to generate photosets is mediated by the user's privacy settings. The generated photographic sets are recommended to the user based upon a determination of the user's interest in a photographic set. A user's interest in a photo set is determined based upon knowledge of the user's past interaction with photographic sets and/or the social network. The recommendation may be refined based on engagement levels of the user by comparing normal usage with the viewing of the first photoset such as click-through rate, frequency of viewing of the same person or location, # of photos looked at, backtracking in the photo, etc. The recommendation may also be used to provide a search result for photographs. For example, a search by a user for photographs of a particular topic that involves his/her friends as indicated by a social graph or other data structure stored by a social network.

In the following description, for the purposes of explanation, numerous specific details are set forth in order to provide a thorough understanding of various embodiments of the invention. It is to be understood that references in the specification to "one embodiment," or "an exemplary embodiment," indicate that the embodiment described may include a particular feature, structure, or characteristic, but every embodiment may not necessarily include the particular feature, structure, or characteristic. Moreover, such phrases are not necessarily referring to the same embodiment. Additionally, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
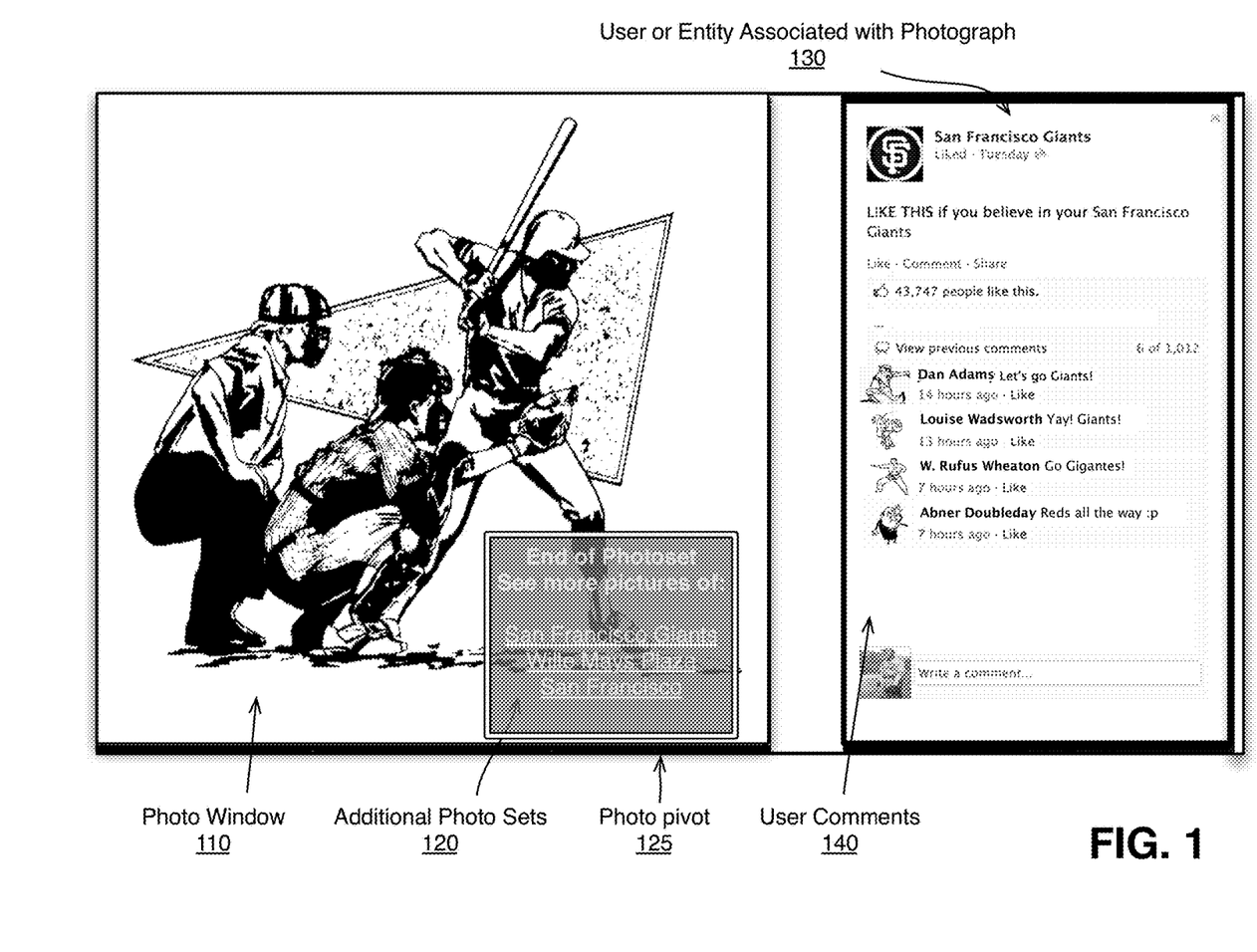
FIG. 1 is a block diagram illustrating an exemplary user interface containing a photoset recommendation to a user.

FIG. 1 is a block diagram illustrating an exemplary user interface containing a photoset recommendation to a user. Multiple user interfaces or methods of making recommendations are possible, however, user interfaces have at least one photo window 110, and have the ability to display a photo pivot 125 that provides a link to another photo or set of photos. Other user interfaces additionally include a user or entity associated with the photograph in the photo window 130, and a user comments section 140. According to embodiments of the invention, a photo pivot 125 containing links to additional photo sets 120 is displayed when a user reaches the end of a photoset, or if the social networking system determines that one or more other photosets potentially contain content of greater interest to the user than the photoset the user is currently browsing. In this example, a photo window 110 contains a picture with content that is categorized based on one or more concepts or meta-concepts, and has multiple associated concepts, as determined by the social networking system.

Metadata associated with the photographs includes user supplied, or auto-generated tag information, geographic location information associated with the photographs, users of the social network associated with the photographs, one or more events associated with the photographs, etc. Pictures or photographs having common tag information, geographic location, common users, or common events are grouped into photosets, and the metadata used to group those photosets is also used to recommend photosets to users of the social networking system. Metadata may also include information about user including actions (metadata of users' albums, friends, events, checkins, etc.); information about a potential photoset to pivot to (# of photos in the set, feedback such as comments and likes on photos in photoset to potentially pivot to, etc.); and privacy settings of the photos of the photoset and/or user.

In one embodiment, as shown in the additional photo sets 120 window, when a user browses a photoset to completion additional photosets are recommended based on the determined interests of the user. One embodiment of the user interface, for example, one presented by the user interface of a mobile application on a user device, includes the photo window 110 and displays a photo pivot 125 with additional photo sets as needed. In other embodiments, such as one presented via a web browser, additional information is available, including the user associated with the current photograph 130, or one or more user comments 140 associated with the picture or photograph.

Figure 2:
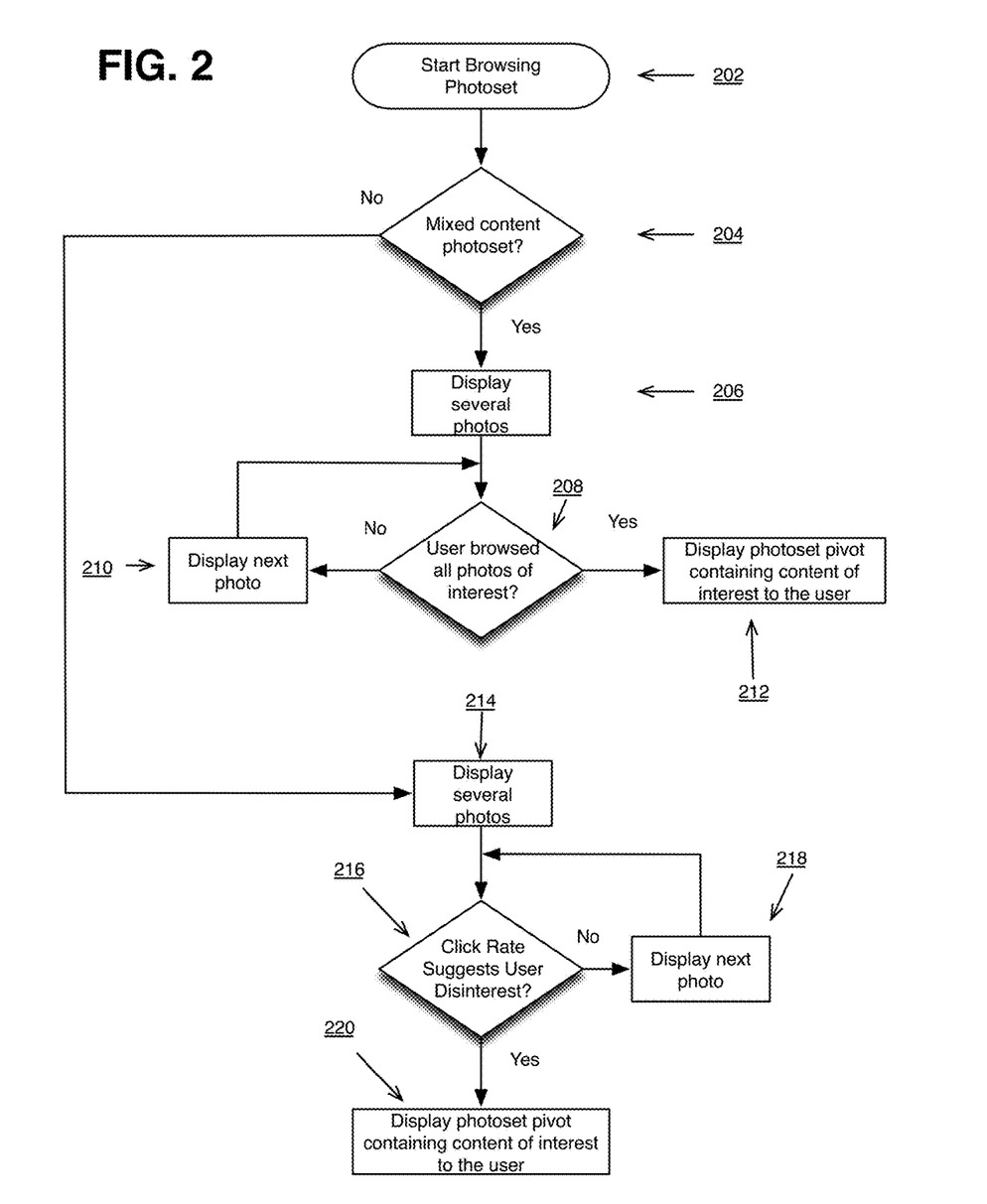
FIG. 2 is a flow diagram illustrating a usage model in which a user received photoset recommendations while browsing photographs shared by users of the social networking system.

FIG. 2 is a flow diagram illustrating a usage model in which a user may receive a photoset recommendation while browsing photographs shared by users of the social networking system. The social networking system offers users the ability to share photographs with other users of the social networking system. In one embodiment, photoset recommendations are made to a user while browsing a photoset if it is determined additional photosets may be of interest to the user. In this example, at block 202, a user starts to browse a photoset of related photographs by selecting a status update from a friend, or by browsing through a set of shared pictures. This selection is received by the social networking system. The user may browse a photoset that is stored by the social networking system or a third party. In some embodiments, when the user is browsing a photoset at a third party's location (either directly on the third party's site or through an interface off the social networking system), a plugin sends an indication of the selection to the social networking system.

At block 204, the social networking system will determine if the photoset that the user is currently viewing is a mixed content photoset which contains some photographs that may be of interest to the user, and some photographs that may not be of interest. For example, the user may be interested in pictures of the user's friends, or pictures associated with the user's current location. Alternatively, the user may not be interested in pictures of users that are not friends, or otherwise unconnected to the user's network. In the case of a mixed content photoset, pictures of greatest interest to the user are displayed, at block 206. As the user advances through several pictures of interest in the photoset, a check, at block 208 is made to determine if the user has browsed all photos of interest to the user. If not, at block 210, the next picture is displayed. Once it is determined, at block 208, that all photos of interest to the user have been displayed, at block 212, a photo pivot, such as the photo pivot 125 of FIG. 1 is displayed, which presents the user with the option of continuing to one or more photosets that contain content that may be of greater interest to the user than the remaining contents of the current photoset.

If the photoset is not a mixed content photoset, and contains content which may be entirely of interest to the user, at block 214, the user is presented with several photos of the photoset to browse, while the click rate through the several photos is analyzed, as shown at block 216. If the click rate through the photos is rapid, suggesting user disinterest with the contents of the photoset, then at block 220, a photoset pivot is displayed to give the user the opportunity to browse photosets which may be of greater interest to the user. If the click rate, at block 216, does not suggest disinterest, then the next photograph is displayed as normal at block 218, and the photoset pivot is not displayed.

Figure 3:
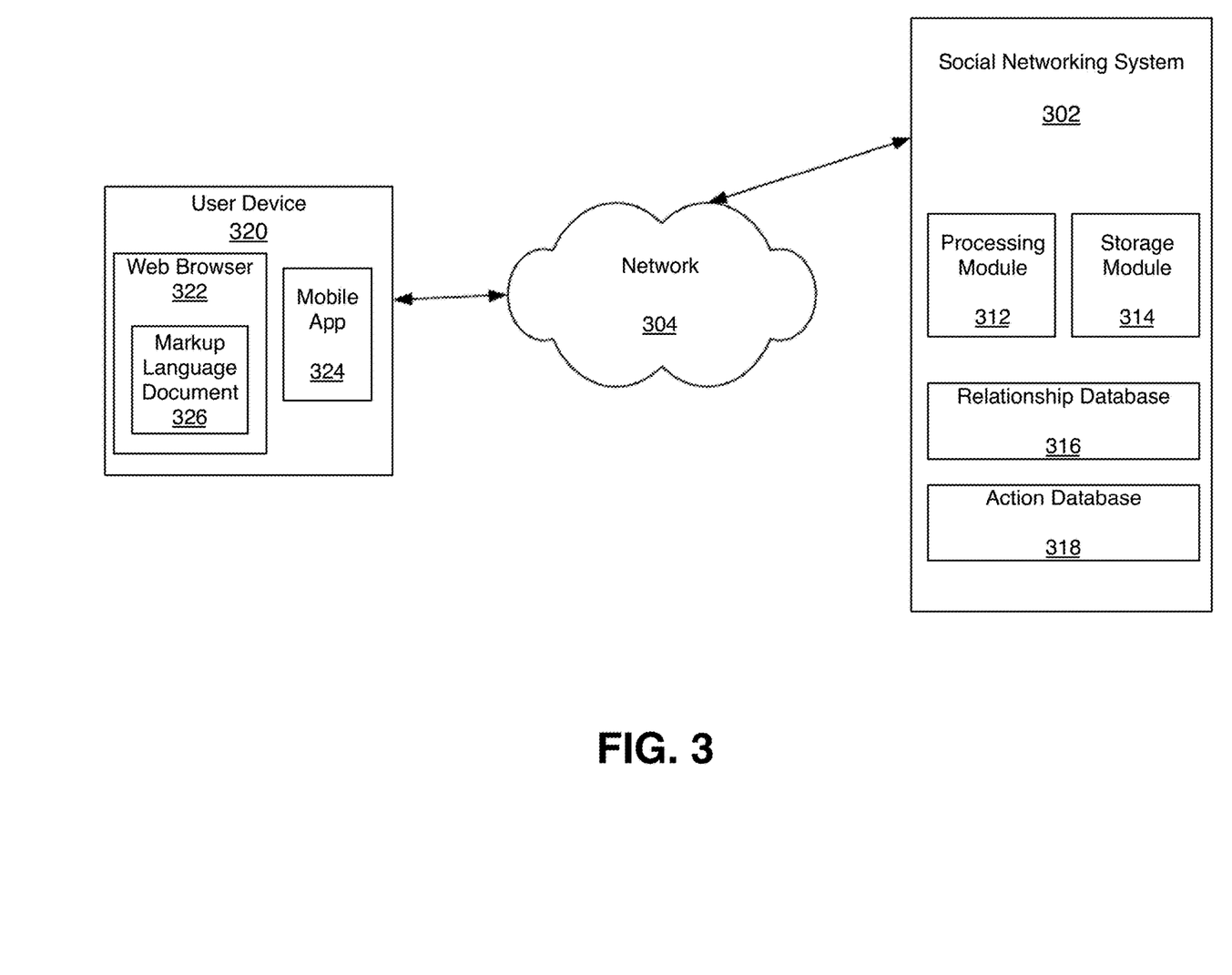
FIG. 3 illustrates an exemplary environment for generating dynamic relationship-based content personalized for users of a social networking system.

FIG. 3 illustrates an exemplary environment for generating dynamic relationship-based content personalized for users of a social networking system. One or more users, such as a user at a user device 320 (such as a desktop, laptop, netbook, tablet, phone, etc.), are coupled to a social networking system 302 via a network 304. One embodiment of a social networking system 302 is a web-based social networking system hosting a website that allows one or more users, such as the user at the user device 320, to communicate with one another via the social networking system 302 website. In one instance, a first user associated with the user device 320 uses a web browser 322 to communicate with one or more second users associated with one or more second user devices via a social networking website associated with the web-based social network 302. The social networking website offers the user an opportunity to connect or reconnect with the one or more second users that attended, for example, the same university as the user. In one embodiment of the social network system, a user uses an application 324 on a user device 320 to communicate with one or more second users associated with one or more second user devices. This application 324 may be a desktop application, or other client, or a mobile application to be run on a tablet computer device, a smartphone, etc.

The user device 320 includes one or more input devices to receive input from a user, and transmit and receive data (inputting a user input) via the network 304. For example, the user device 320 may be a desktop computer, a laptop computer, a smart phone, a personal digital assistant (PDA), or any other device including computing functionality and data communication capabilities.

In one embodiment, the user device 320 displays content from the social networking system 302 by processing a markup language document 326 received from the social networking system 302 using a web browser 322. The markup language document 326 identifies content and one or more instructions describing formatting or presentation of the content. By executing the instructions included in the markup language document 326, the web browser 322 application displays the identified content using the format or presentation described by the markup language document 326. For example, the markup language document 326 includes instructions for generating and displaying a web page having multiple frames that include text and/or image data retrieved from the social networking system 302. In various embodiments, the markup language document 326 is a data file including extensible markup language (XML) data, extensible hypertext markup language (XHTML) data or other markup language data.

According to exemplary embodiments, one or more networks or communities may be provided for each user. For example, the user may have a network comprised of people grouped according to a university attended, a network comprised of people grouped according to the user's geographical location of residence, a network comprised of people grouped according to a common field of work, a network comprised of people grouped according to a particular business, and so forth.

The social networking system 302 comprises one or more computing devices storing a social network, or mapping of a social graph, comprising a plurality of users and providing users of the social network with the ability to communicate and interact with other users of the social network. In one embodiment, the social networking system 302 comprises a processing module 312, a storage module, 314, a relationship database 316, and an action database 318.

A processing module 312 is provided for recommending photosets to users based on user interests. The processing module 312 associates user actions with user relationship data to produce consolidated data that contains one or more concepts that are of interest, or are not of interest to a user. The processing module 312 also identifies one or more elements associated with the consolidated data, and aggregates the consolidated data based on the one or more elements to produce aggregated consolidated data. In one embodiment, the processing module 312 is configured to apply weight factors to the aggregated, consolidated data to generate dynamic relationship-based content that is personalized for users of the social networking system 302. The processing module is described in further detail in FIG. 4 below.

A storage module 314 is provided for storing the dynamic relationship-based content that is personalized for users of the social networking system 302. One embodiment of the storage module 314 contains, in conjunction with the relationship database 316, user profile information provided by the user, such as data describing the user, or the user's relationships with other users. Additionally, aggregated content generated by the processing module 312 is stored in the storage database, and can include aggregate data on the general concepts of interest, or not of interest to the user's network, the user's friends, or a sub-set of user's friends, such as the friends from the user's home town, or the friends that live near, or are otherwise spatially proximate to the user.

A relationship database 316 is provided for storing relationship data associated with each of the users. According to exemplary embodiments, relationship database 316 comprises a user profile for each user of the social network. When a user joins the social network, a user profile is generated for the user, and the user can specify relationships with one or more other users. The user can assign categories, groups, networks, and so forth to the one or more other users with which the user has a relationship. The relationship, for example, may specify that the user is a "friend", "friend of a friend", "family", "schoolmate", and so forth; any type of relationship may be specified. In one embodiment, the relationship database allows the user to group other users according to one or more categories. When the user updates information in the user's profile, such as adding additional contacts or friends, the user's profile in the relationship database 316 is updated with the information added.

A "friendship" represents a connection, such as a defined social relationship, between a pair of users of the social network environment. A "friend," refers to any user of the social network environment with which another user has formed a connection, friendship, association, or relationship. Friendship connections may be visible to other users, especially those who themselves are friends with one or both of the registered users. A friend of a registered user may also have increased access privileges to content, especially user-generated or declared content, on the registered user's profile or other page. It should be noted, however, that two users who have a friend connection established between them in the social graph may not necessarily be friends in the conventional sense. For example, a user may be a business, organization, sports team, or other non-human entity, and thus, incapable of being a friend with a human being user in the conventional sense of the word.

The action database 318 stores one or more user actions or activities on the social networking system 302. For example, the action database 318 stores user actions with one or more items of content, such as news stories, other users' profiles, and/or email provided via social networking system. Any type of user action may be stored in the action database 318. In one embodiment, action data represents a particular user's actions on social networking system for a particular period, such as the most recent hour, six hours, day, week, or month. For example, User A's action data may represent User A's actions for the last hour of sending an email to another user, electing to attend a concert with three other users, clicking through pictures, adding a photo to User A's profile, etc.

Figure 4:
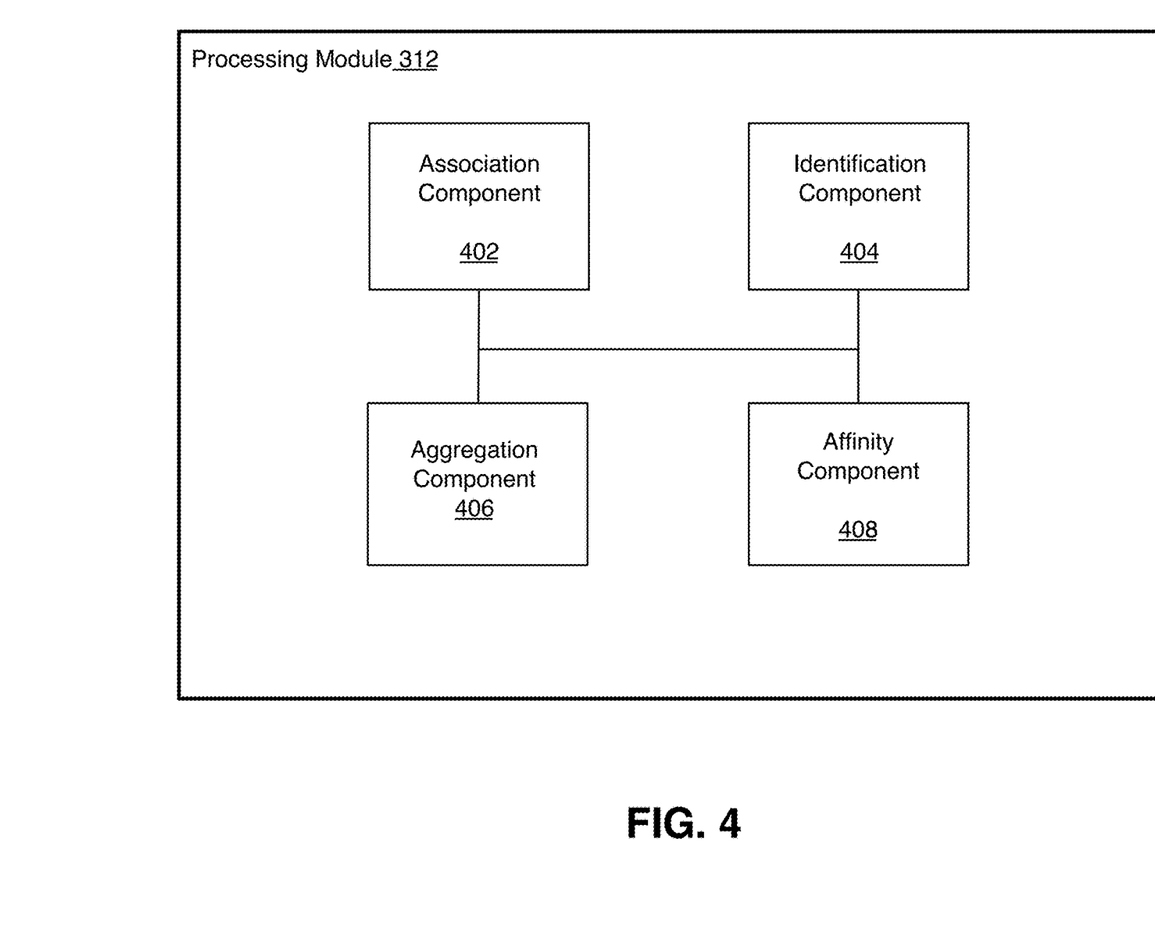
FIG. 4 is a block diagram of an exemplary processing module according to one embodiment of the invention.

FIG. 4 is a block diagram of an exemplary processing module according to one embodiment of the invention. The processing module 312 comprises an association component 402, an identification component 404, an aggregation component 406, and an affinity component 408. The association component 402 associates one or more user actions with the user relationship data to produce consolidated user data. For example, User A's profile may include fifteen friends of User A and another twenty friends of User A's friends ("friends of friends"). The association component 402 associates User A's actions with User A's friends, friends of friends, and/or other users. For instance, association component 402 might associate User A's action of joining a group dedicated to the baseball team, The San Francisco Giants, with User A's friends who also belong to the same group. In this example, the produced consolidated data might be in the form of "User A joins San Francisco Giants Group, which also includes Member A's friends Dan, Louise and Rufus."

An identification component 404 is provided as part of processing module 312 to identify one or more elements associated with the consolidated data. For example, with respect to consolidated data in the form of "User A joins San Francisco Giants Group, which also includes Member A's friends Dan, Louise and Rufus," the identification component 404 could identify the elements of "San Francisco Giants." According to some embodiments, identification component 404 may identify any element of an action associated with relationship data (to form consolidated data). For example, identification component 404 may identify an element based on action type, members involved, media or content type, and/or multiple elements thereof. The identified elements are then associated with one or more concepts that categorize the elements. For example, "San Francisco Giants" can be associated with the "baseball team" concept, which indicates one or more users is a fan of this baseball team. Additionally, a meta-concept, such as sports, or sports teams, or baseball teams, can be associated with the element, group, and the users of the group. Associated concepts can also be identified as potentially of relevance to a user or a user's friends. For example, as locations such as San Francisco, Calif., or Willie Mays Plaza are associated with the San Francisco Giants, and such concepts, if identified among elements on the social networking system 302, would be associated with the relevant users or groups.

An aggregation component 406 is provided to aggregate the consolidated data based on the one or more elements to produce aggregated consolidated data. For example, aggregation component 406 might utilize the elements of "San Francisco Giants" to aggregate the consolidated data of "User A joins San Francisco Giants Group, which also includes Member A's friends Dan, Louise and Rufus," with other consolidated data sharing the same elements of "San Francisco Giants." In this example, aggregation by aggregation component 406 might result in aggregated consolidated data in the form of "User A and fifty other members of User A's network join the San Francisco Giants Group." Aggregation component 406 may utilize other parameters or criteria for aggregation and remain within the scope of embodiments claimed herein.

An affinity component 408 is provided to apply weight factors to the aggregated consolidated data to generate dynamic relationship-based content personalized for users of the social networking system 102. Based on one or more user activities and associated relationships, an affinity for past, present, or future content is determined by the affinity component 408. Any type of variable can be considered when determining an affinity for the affinity component 408 to apply the weights to the aggregated consolidated data. In a further embodiment, the affinity component 408 is utilized to assign an order to the content presented to the user. For example, if User A is friends with User B and User C, and User B posts a photograph of User B at a Los Angeles Dodgers baseball game, that may be rated lower than pictures of User C at a San Francisco Giants victory parade. Accordingly, pictures of User B at a Los Angeles Dodgers are less likely to be included in a dynamic photoset that is recommended to User A when User A is browsing status updates, or photo sets involving baseball, or the San Francisco Giants.

Figure 5:
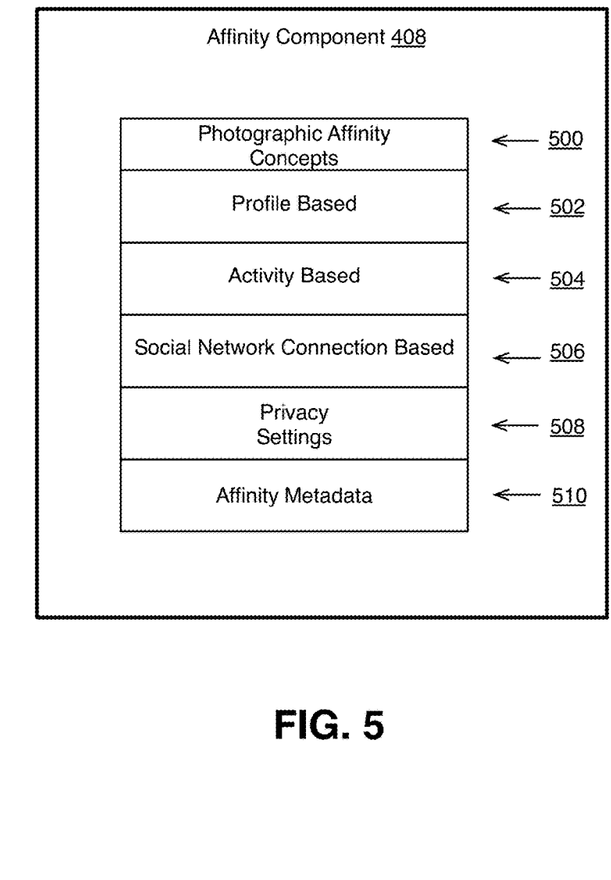
FIG. 5 is a block diagram of an exemplary affinity component according to one embodiment of the invention.

FIG. 5 is a block diagram of an exemplary affinity component according to one embodiment of the invention. The affinity component 408 contains one or more data structures and analysis modules to apply affinity weight factors to the aggregated consolidated data to generate photoset recommendations. For example, a photographic affinity concepts module 500 is provided in one embodiment to apply weight factors to data associated with a user based on the source of the data. Any number of sources available to the affinity component 408 of the processing module 312 (FIG. 3) are available for analysis, including user submitted profile based data 502, activity based data 504 derived from the action database 318, or data based on a user's social network connections 506 derived from the association component 402. User submitted profile based data 502 includes user specific information such as user birthday, user education background, user gender, etc. User activity based data 504 includes data based on user searches, user comments, or other activity derived from the user's use of the social network functionality. Social network connection based data 506 includes data derived from the profile and usage information of users with social network contacts with the user, such as friends of the user. For a given user, privacy settings 508 are available to limit what information about the user is available to users associated with the user, and a user's privacy settings are honored when considering what user data or user identifiable data is shared with other users. In one embodiment, a data structure containing various elements of affinity metadata 510 is contained in the affinity component 408 to link the relevant data used for analysis.

Figure 6:
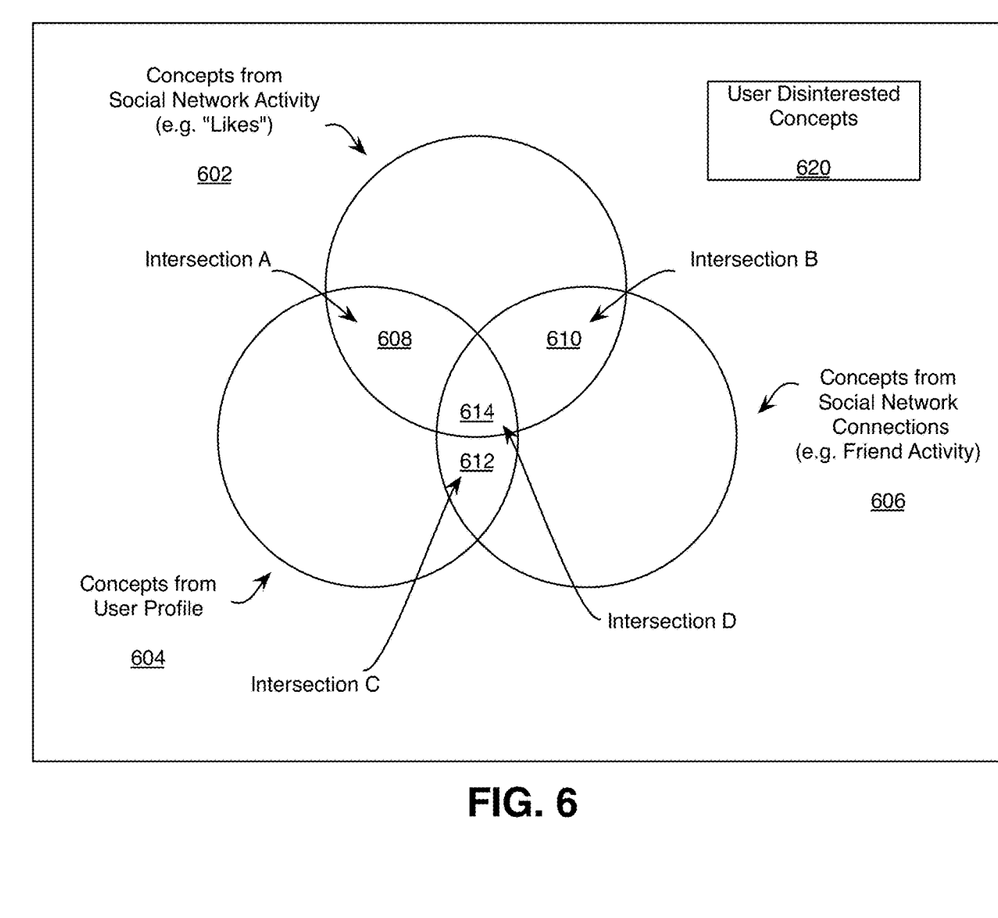
FIG. 6 is a visual representation of one embodiment of the interrelation of concepts that is used to determine which photosets are likely to be of interest to the user.

FIG. 6 is a visual representation of one embodiment of the interrelation of concepts that is used to determine which photosets are likely to be of interest to the user. Concepts, such as those identified by the association component 402 (FIG. 4), can be weighted based on source by the affinity component 408, and subsequently analyzed to find overlaps between the available content and the interests of the user. For example, one or more concepts can be identified as potentially of interest to the user based on concepts from the user's social network activity 602, user submitted profile information, 604, or concepts from the user's social network connections 606, such as friend activity, or aggregated activity across the user's connections. In one embodiment, sources are weighted based on the probability that the data accurately reflects the user's current interest. These weights may be changed or adjusted based on overall data analytics, and the weights may differ from user to user. For example, the user's active use of the social network, via searching for certain concepts, viewing photographs associated with or categorized by certain concepts, or expressing interest in, or affinity with a concept is considered to be an accurate reflection of the user's current interests. Additionally, a user can demonstrate express affinity with a concept or organization by using a "Like" feature of the social network. Accordingly, concepts derived from social network activity (e.g., "Likes") are afforded an affinity weight factor of one, which, in one embodiment, is the highest weight factor.

Concepts derived from the user's profile 604 are presumed to be accurate reflections of the user's interests at the time of profile creation. However, over time there may be a deviation between concepts that are indicated to be of interest based on profile information 604, and those based on social network activity 602. Accordingly, concepts considered potentially of interest to a user are weighted based on a determination of their relative level of probability of indicating current user interest. In one embodiment, an affinity weight factor in the range of 0.7 to 0.9 is an appropriate weight, reflecting a high, but less than express probability of interest in a concept.

Concepts derived from the profile and social network activity of the user's friends 606 are presumed to be moderately accurate, but less precise reflections of the user's interests. While it can be presumed that users who are friends have at least some interests in common, only aggregate, and less specific information can be successfully derived from a user's social network. Accordingly, an affinity weight factor in the range of 0.4 to 0.6 is an appropriate weight to apply to concepts derived from the social network connections of a user, reflecting a moderate, but less precise probability of interest in a concept.

Given concepts from the user profile 604, and concepts from the user activity on the social network 602, an intersection A 608 is derived which contains a set of one or more concepts that are common to concepts from the user profile, and concepts from the user's social network activity. It is to be noted that the relative size of the overlaps depicted in FIG. 6 are for example purposes, and do not indicate a specific weight applied to one or more sources of information. Using a similar line of analysis, an intersection B 610, and an intersection C 612 are also determinable based on an intersection created by at least two sources of information. Additionally, an intersection D 614 is possible, which contains concepts of interest to a user based on at least three sources, and thus are highly likely to be of interest to the user.

Accordingly, dynamic content, such as photosets, associated with concepts at intersection D 614 are most likely to be recommended to the user. Concepts from two or more sources, which overlap, are given additive weights. For example, a concept at intersection A 608 is given the weight factor of user profile concepts 604 plus social network activity concepts 602. In this case a weight factor ranging from 1.7 to 1.9; a concept at intersection B 610 is given a weight factor ranging from 1.4 to 1.6; a concept at intersection C 612 is given a weight factor ranging from 1.1 to 1.5. An intersection of concepts at D 614 are highly likely to be of interest to the user, and can have a weight factor of 2.1 to 2.5. It is to be understood that the precise numbers used are for exemplary purposes, and embodiments are not limited to these precise weight factors.

In some instances, one or more user disinterested concepts 620 are also identified, which lie well outside of the interest of the user based on all available sources of information. Dynamic content, such as photosets, that are based on, or derived from this concept are less likely to be recommended to the user. Alternatively, such user disinterested concepts 620 may lie within one of the intersections of sources of concepts of likely user interest, but the user has expressly indicated a lack of interest in such concepts or as not shown much of an interest in previous interactions (quickly closes a photo, does not view an entire set, etc.). In that case, the user disinterested concept 620 is less likely to be used to recommend photosets, or other dynamic content, to the user even though aggregate data from the user's friends or the user's network may suggest a possible interest in such concept.

The processes depicted in the figures that follow are performed by processing logic that comprises hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described may be performed in a different order. It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

Figure 7:
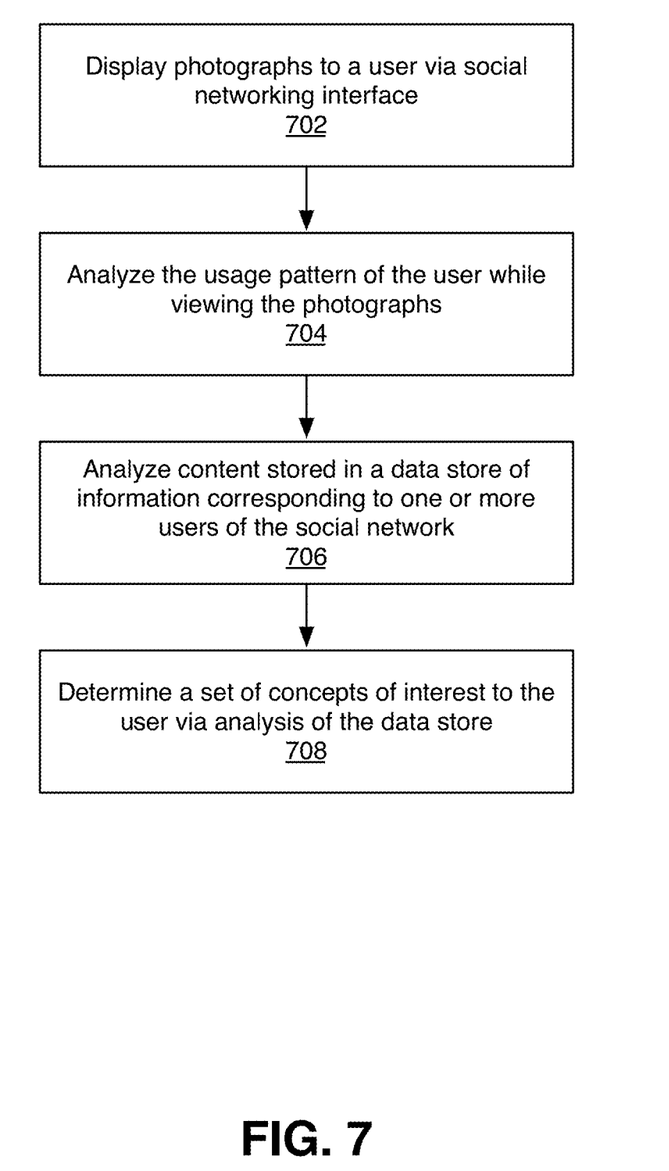
FIG. 7 is a flow diagram of one embodiment of a method of recommending a set of photographs of interest to the user.

FIG. 7 is a flow diagram of one embodiment of a method of recommending a set of photographs of interest to the user. In one embodiment, an operation described at block 702 is used to display photographs to a user via a social networking interface. The social networking interface includes, but is not limited to those available via a user device 320, such as via a web browser 322 or a mobile app 324. At block 704, the usage patterns of the user are analyzed while the user is viewing the photographs in the photo set. In one embodiment, this includes actions such as whether the user clicked or selected the photoset from a search for specific content, or a specific user. If a user is viewing a photoset, the user click rate through the photoset is potentially an indicator of whether the user is viewing a photoset the user has previously viewed, or if the user is viewing a photoset containing photographs that have not been previously viewed. For example, a user may rapidly click through old photographs from a previous season's baseball game in an attempt to find recent photographs from a recent baseball game. Additionally, metadata associated with the photographs viewed by the user are analyzed. The tags associated with the pictures or photographs viewed by the user, including the people associated with the pictures or the location or events associated with the pictures viewed by the user.

This operation allows the social network system to gather real-time data for use in determining a current set of concepts of interest to the user, which allows the system to accurately make photoset recommendations to the user.

At block 706, data previously derived that has been stored in a data store, such as the storage database 312, is analyzed to gather a set of concepts that have been previously established to be of interest to the user based on past data. This includes concept data and user data derived from a user's profile, and aggregate data available for analysis based on the user's friends, and other connections, as allowable by user privacy settings, and as weighted according to the interrelations discussed in FIG. 6. At block 708, a set of concepts is determined that are of interest to the user via analysis of various concept data, as described above in FIGS. 4 and 5. At block 710, a set of photographs of interest to the user is recommended based on the user interest analysis illustrated in FIG. 6, and as further described in FIG. 8.

Figure 8:
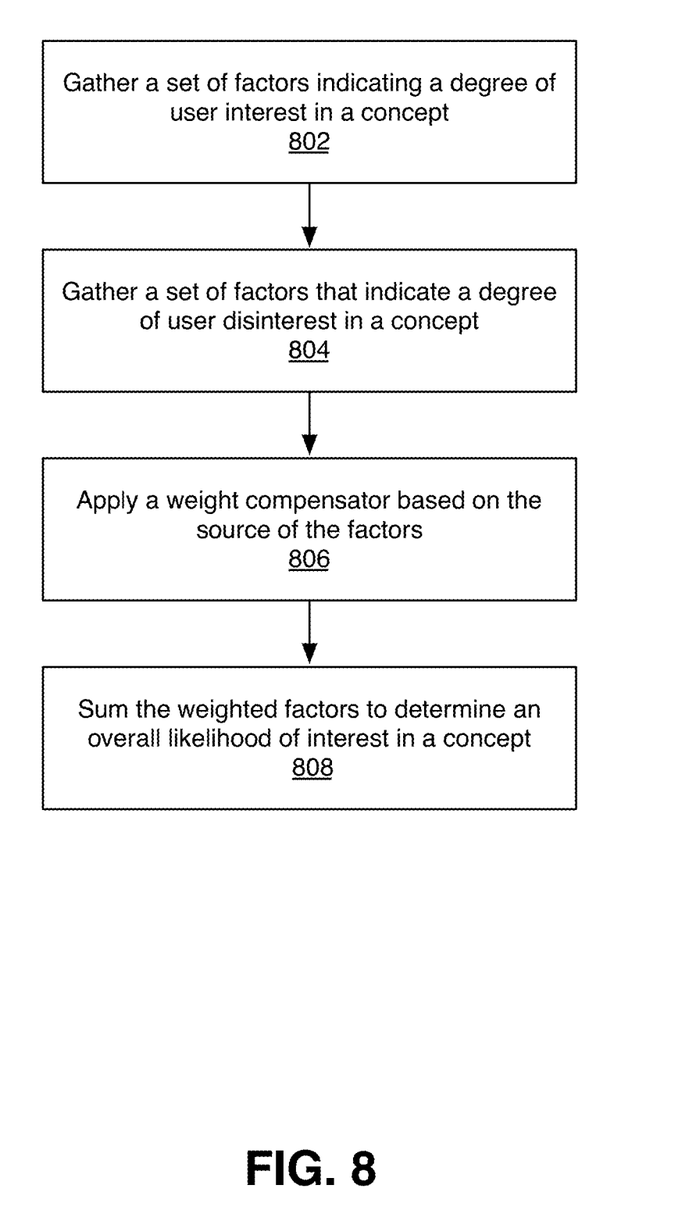
FIG. 8 is a flow diagram of one embodiment of a method of determining a set of concepts of interest to a user based on data stored on the social networking system.

FIG. 8 is a flow diagram of one embodiment of a method of determining a set of concepts of interest to a user based on data available to the social networking system 302. In one embodiment, a set of factors indicating a certain degree of user interest in a concept is gathered based upon information known or derived about a user, as indicated at block 802. At block 804, a set of factors that indicate a degree of user disinterest in a concept is gathered and used to filter or offset the factors indicating a degree of user interest in a concept. At block 806, an operation to apply a weight compensator based on the source of the one or more factors, where the factor weight adjustments reflect a probability analysis that the source is informative as to a user's current interest in one or more concepts or one or more sets of concepts. At block 808, an analysis operation, such as an embodiment of the operation illustrated in FIG. 6, is conducted to sum the set of factors based on the likelihood of user interest and the likelihood of user disinterest in the concept or set of concepts. Using the weighted factor sums, the user interest in a concept can be determined. Using the user interest data, a photoset recommendation is made.

Figure 9:
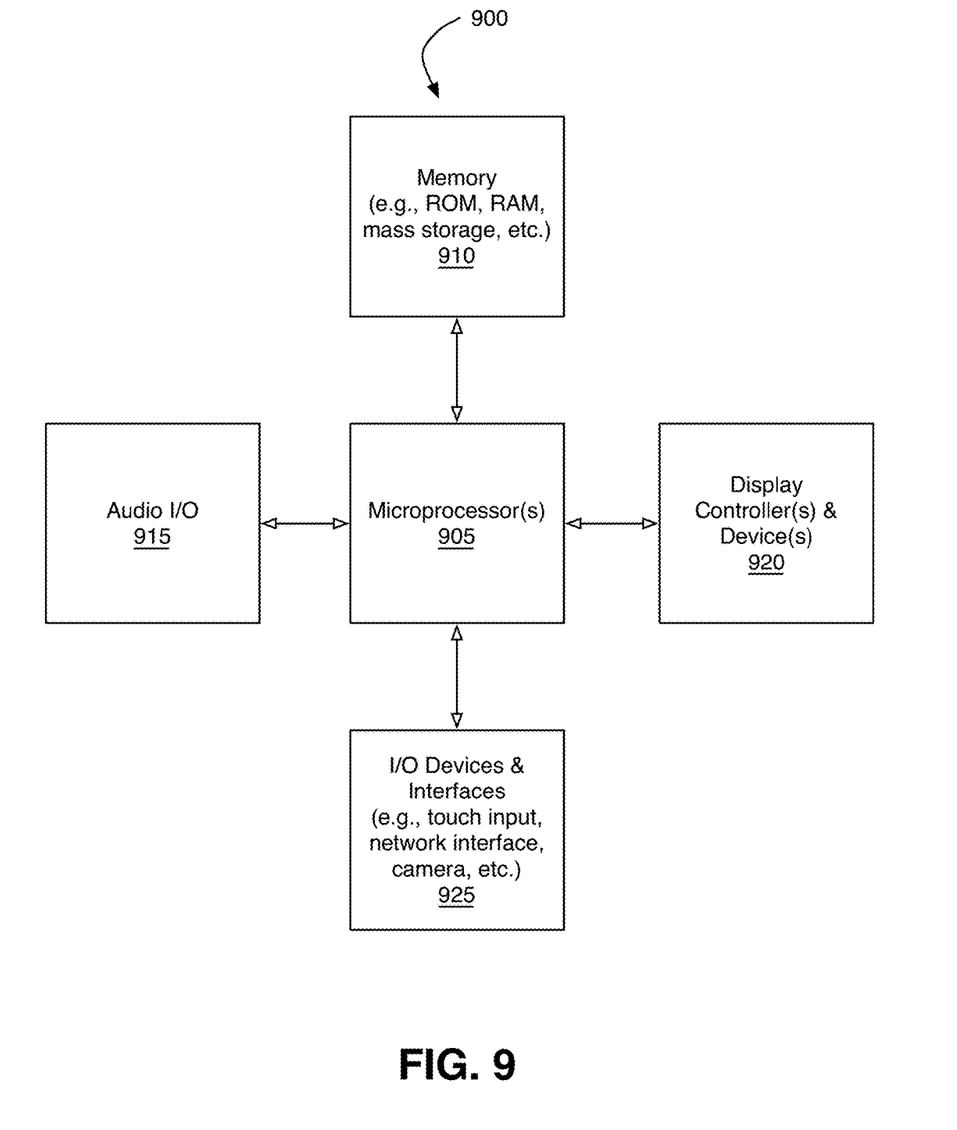
FIG. 9 illustrates, in block diagram form, an exemplary processing system to provide or receive photoset recommendations.

FIG. 9 illustrates, in block diagram form, an exemplary processing system 900 to provide or receive photoset recommendations. Data processing system 900 includes one or more microprocessors 905 and connected system components (e.g., multiple connected chips). Alternatively, the data processing system 900 is a system on a chip.

The data processing system 900 includes memory 910, which is coupled to the microprocessor(s) 905. The memory 910 may be used for storing data, metadata, and programs for execution by the microprocessor(s) 905. The memory 910 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 910 may be internal or distributed memory.

The data processing system 900 also includes an audio input/output subsystem 915 which may include a microphone and/or a speaker for, for example, playing back music or other audio, receiving voice instructions to be executed by the microprocessor(s) 905, playing audio notifications, etc.

A display controller and display device 920 provides a visual user interface for the user, e.g., the GUI window illustrated in FIG. 1.

The data processing system 900 also includes one or more input or output ("I/O") devices and interfaces 925, which are provided to allow a user to provide input to, receive output from, and otherwise transfer data to and from the system. These I/O devices 925 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 900.

The I/O devices and interfaces 925 may also include a connector for a dock or a connector for a USB interface, FireWire, Thunderbolt, Ethernet, etc. to connect the system 900 with another device, external component, or a network. Exemplary I/O devices and interfaces 925 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 900 with another device, external component, or a network and receive stored instructions, data, tokens, etc.

It will be appreciated that one or more buses, may be used to interconnect the various components shown in FIG. 9.

The data processing system 900 is an exemplary representation of the user's device 320, and may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, the data processing system 900 may be a network computer, server, or an embedded processing device within another device or consumer electronic product. As used herein, the terms computer, system, device, processing device, and "apparatus comprising a processing device" may be used interchangeably with the data processing system 900 and include the above-listed exemplary embodiments.

It will be appreciated that additional components, not shown, may also be part of the system 900, and, in certain embodiments, fewer components than that shown in FIG. 9 may also be used in a data processing system 900. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 910 or other non-transitory machine-readable storage medium. The software may further be transmitted or received over a network (not shown) via a network interface device 925. In various embodiments, hardwired circuitry may be used in combination with the software instructions to implement the present embodiments. Thus, the techniques are not limited to any specific combination of hardware circuitry and software, or to any particular source for the instructions executed by the data processing system 900.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
   providing, to a client device associated with a user of a networking system and via a networking system application installed on the client device, a networking system interface;
   receiving input, from the user via the networking system interface, to browse a first photograph album comprising two or more photographs shared on the networking system;
   analyzing, in response to receiving the input via the networking system interface, networking system information associated with the user to determine concepts to be of interest to the user, wherein the networking system information associated with the user comprises the user's social networking activity, the user's profile information, and the user's networking system connections;
   determining, using metadata associated with each of the two or more photographs within the first photograph album and concepts determined by the networking system to be of interest to the user, that the first photograph album comprising two or more photographs includes both photographs that may be of interest to the user and photographs that may not be of interest to the user;

displaying, within the networking system interface, the photographs that may be of interest to the user within the first photograph album to the user; and in response to determining that all of the photographs from the first photograph album that may be of interest to the user have been displayed to the user but prior to displaying the photographs that may not be of interest to the user within the first photograph album, providing a link to a second photograph album of photographs within the networking system interface.

2. The computer-implemented method of claim 1, further comprising, providing, in connection with the link to the second photograph album of photographs, a first option of continuing to browse the first set to view photographs that may not be of interest to the user.

3. The computer-implemented method of claim 1, wherein networking system information associated with the user further comprises preferences indicated by the user while using the networking system.

4. The computer-implemented method of claim 1, further comprising:
  analyzing a usage pattern of the user while viewing the first photograph album comprising two or more photographs to determine an interest factor of the user in each of the photographs viewed within the first photograph album; and
  updating the concepts determined by the networking system to be of interest to the user based upon the usage pattern.

5. The computer-implemented method of claim 4, wherein analyzing the usage pattern of the user includes analyzing one or more of: a metadata tag associated with at least one of the photographs viewed by the user, a user associated with at least one of the photographs viewed by the user, a location associated with at least one of the photographs viewed by the user, or an event associated with at least one of the photographs viewed by the user.

6. The computer-implemented method of claim 4, wherein analyzing the usage pattern of a user while viewing the photographs in the first photograph album includes analyzing an amount of time spent viewing individual photographs in the first photograph album.

7. The computer-implemented method of claim 1, wherein concepts are determined by the networking system to be of interest to the user by:
  gathering a set of factors that indicate that the user has a degree of interest in a concept;
  gathering a set of factors that indicate that the user is disinterested in a concept; and
  weighting one or more the gathered factors based upon a source of the one or more gathered factors.

8. A non-transitory computer-readable medium having stored thereon computer-executable instructions that, when executed by a processor, cause a computing device to:
  provide, to a client device associated with a user of a networking system and via a networking system application installed on the client device, a networking system interface;
  receive input, from the user via the networking system interface, to browse a first photograph album comprising two or more photographs shared on the networking system;
  analyze, in response to receiving the input via the networking system interface, networking system information associated with the user to determine concepts to be of interest to the user, wherein the networking system information associated with the user comprises the user's social networking activity, the user's profile information, and the user's networking system connections;
  determine, using metadata associated with each of the two or more photographs within the first photograph album and concepts determined by the networking system to be of interest to the user, that the first photograph album comprising two or more photographs includes both photographs that may be of interest to the user and photographs that may not be of interest to the user;
  display, within the networking system interface, the photographs that may be of interest to the user within the first photograph album to the user; and
  in response to determining that all of the photographs from the first photograph album that may be of interest to the user have been displayed to the user but prior to displaying the photographs that may not be of interest to the user within the first photograph album, provide a link to a second photograph album of photographs within the networking system interface.

9. The non-transitory computer-readable medium of claim 8, further storing computer-executable instructions that, when executed by the processor, cause the computing device to provide, in connection with the link to the second photograph album of photographs, a first option of continuing to browse the first set to view photographs that may not be of interest to the user.

10. The non-transitory computer-readable medium of claim 8, wherein networking system information associated with the user further comprises preferences indicated by the user while using the networking system.

11. The non-transitory computer-readable medium of claim 8, further storing computer-executable instructions that, when executed by the processor, cause the computing device to:
  analyze a usage pattern of the user while viewing the first photograph album comprising two or more photographs to determine an interest factor of the user in each of the photographs viewed within the first photograph album; and
  update the concepts determined by the networking system to be of interest to the user based upon the usage pattern.

12. The non-transitory computer-readable medium of claim 11, wherein the computer-executable instructions, when executed by the processor, cause the computing device to analyze the usage pattern of the user by analyzing one or more of: a metadata tag associated with at least one of the photographs viewed by the user, a user associated with at least one of the photographs viewed by the user, a location associated with at least one of the photographs viewed by the user, or an event associated with at least one of the photographs viewed by the user.

13. The non-transitory computer-readable medium of claim 11, wherein analyzing the usage pattern of a user while viewing the photographs in the first photograph album includes analyzing an amount of time spent viewing individual photographs in the first photograph album.

14. The non-transitory computer-readable medium of claim 8, further storing computer-executable instructions that, when executed by the processor, cause the computing device to determine concepts of interest to the user by:
  gathering a set of factors that indicate that the user has a degree of interest in a concept;
  gathering a set of factors that indicate that the user is disinterested in a concept; and weighting one or more the gathered factors based upon a source of the one or more gathered factors.

15. An apparatus comprising:
a processing device; and
a memory coupled to the processing device, the memory storing instructions which, when executed by the processing device, cause the apparatus to:
provide, to a client device associated with a user of a networking system and via a networking system application installed on the client device, a networking system interface;
receive input, from the user via the networking system interface, to browse a first photograph album comprising two or more photographs shared on the networking system;
analyze, in response to receiving the input via the networking system interface, networking system information associated with the user to determine concepts to be of interest to the user, wherein the networking system information associated with the user comprises the user's social networking activity, the user's profile information, and the user's networking system connections;
determine, using metadata associated with each of the two or more photographs within the first photograph album and concepts determined by the networking system to be of interest to the user, that the first photograph album comprising two or more photographs includes both photographs that may be of interest to the user and photographs that may not be of interest to the user;
display, within the networking system interface, the photographs that may be of interest to the user within the first photograph album to the user; and
in response to determining that all of the photographs from the first photograph album that may be of interest to the user have been displayed to the user but prior to displaying the photographs that may not be of interest to the user within the first photograph album, provide a link to a second photograph album of photographs within the networking system interface.

16. The apparatus of claim 15, wherein execution of the instructions further causes the apparatus to provide, in connection with the link to the second photograph album of photographs, a first option of continuing to browse the first set to view photographs that may not be of interest to the user.

17. The apparatus of claim 15, wherein networking system information associated with the user further comprises preferences indicated by the user while using the networking system.

18. The apparatus of claim 15, wherein execution of the instructions further causes the apparatus to:
analyze a usage pattern of the user while viewing the first photograph album comprising two or more photographs to determine an interest factor of the user in each of the photographs viewed within the first photograph album; and
update the concepts determined by the networking system to be of interest to the user based upon the usage pattern.

19. The apparatus of claim 18, wherein analyzing the usage pattern of the user includes analyzing one or more of: a metadata tag associated with at least one of the photographs viewed by the user, a user associated with at least one of the photographs viewed by the user, a location associated with at least one of the photographs viewed by the user, and/or an event associated with at least one of the photographs viewed by the user.

20. The apparatus of claim 18, wherein analyzing the usage pattern of the user while viewing the photographs in the first photograph album includes analyzing an amount of time spent viewing individual photographs in the first photograph album.

* * * * *